(12) United States Patent  
Suzuki

(10) Patent No.: US 9,821,467 B2  
(45) Date of Patent: Nov. 21, 2017

(54) OBJECT PICK-UP SYSTEM AND METHOD FOR PICKING UP STACKED OBJECTS

(71) Applicant: FANUC CORPORATION, Yamanashi (JP)

(72) Inventor: Tadanori Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/133,231

(22) Filed: Apr. 20, 2016

(65) Prior Publication Data

US 2016/0332299 A1    Nov. 17, 2016

(30) Foreign Application Priority Data

May 13, 2015 (JP) ................... 2015-098069

(51) Int. Cl.  
*B25J 9/16* (2006.01)  
*G06K 9/00* (2006.01)

(52) U.S. Cl.  
CPC ............ *B25J 9/1694* (2013.01); *B25J 9/1612* (2013.01); *B25J 9/1697* (2013.01); *G06K 9/00664* (2013.01); *B25J 9/1679* (2013.01); *G05B 2219/37555* (2013.01); *G05B 2219/39475* (2013.01); *G05B 2219/40053* (2013.01); *Y10S 901/02* (2013.01); *Y10S 901/31* (2013.01); *Y10S 901/40* (2013.01); *Y10S 901/47* (2013.01)

(58) Field of Classification Search  
CPC ........ B25J 9/1694; B25J 9/1697; B25J 15/00; G05B 2219/39475; G05B 2219/40053  
See application file for complete search history.

(56) References Cited

U.S. PATENT DOCUMENTS

| | | | | |
|---|---|---|---|---|
| 3,901,547 A * | 8/1975 | Skinner, II | ............. | B25J 15/103 294/106 |
| 7,734,376 B2 * | 6/2010 | Watanabe | ................ | B25J 15/00 700/245 |
| 8,644,986 B2 * | 2/2014 | Tsuboi | ................. | G05B 13/021 414/1 |
| 8,751,048 B2 * | 6/2014 | Shimizu | ................. | B25J 9/1679 700/245 |
| 9,095,978 B2 * | 8/2015 | Shi | .......................... | B25J 9/1633 |
| 9,233,470 B1 * | 1/2016 | Bradski | .................... | B25J 9/163 |

(Continued)

FOREIGN PATENT DOCUMENTS

JP   61-273418 A    12/1986  
JP   2012-171018 A    9/2012

(Continued)

*Primary Examiner* — Thomas Randazzo  
(74) *Attorney, Agent, or Firm* — Hauptman Ham, LLP

(57) ABSTRACT

An object pick-up system able to use a simpler configuration to place picked up objects at a predetermined location with the directions of the picked up objects aligned. The object pick-up system is provided with a robot hand, manipulator, vision sensor, arrangement determination part setting the position and posture of the robot hand when gripping an object, manipulator controller controlling the manipulator, and robot hand controller controlling the robot hand. The manipulator controller places the robot hand at a position and posture giving rise to a moment in the object. The robot hand controller prevents an object from dropping from the robot hand while the object is rotated by the action of gravity.

6 Claims, 20 Drawing Sheets

(56) References Cited

U.S. PATENT DOCUMENTS

| | | | |
|---|---|---|---|
| 9,399,293 B2* | 7/2016 | Shin | B25J 9/1638 |
| 9,469,035 B2* | 10/2016 | Noda | B25J 9/0018 |
| 9,519,736 B2* | 12/2016 | Atohira | G06F 17/5009 |
| 2011/0040427 A1* | 2/2011 | Ben-Tzvi | B25J 5/005 |
| | | | 701/2 |
| 2014/0121836 A1* | 5/2014 | Ban | B25J 9/0093 |
| | | | 700/259 |
| 2015/0120054 A1* | 4/2015 | Watanabe | B25J 9/1612 |
| | | | 700/259 |
| 2015/0124057 A1 | 5/2015 | Yamazaki | |
| 2015/0251314 A1* | 9/2015 | Nammoto | B25J 9/1612 |
| | | | 700/259 |
| 2015/0283704 A1* | 10/2015 | Watanabe | B25J 9/1612 |
| | | | 700/259 |

FOREIGN PATENT DOCUMENTS

| | | |
|---|---|---|
| JP | 2012-171019 A | 9/2012 |
| JP | 2014-87913 A | 5/2014 |
| JP | 2015-77653 A | 4/2015 |
| JP | 2015-089590 A | 5/2015 |

\* cited by examiner

OBJECT PICK-UP SYSTEM AND METHOD FOR PICKING UP STACKED OBJECTS

RELATED APPLICATIONS

The present application claims priority to Japanese Patent Application Number 2015-098069, filed May 13, 2015, the disclosure of which is hereby incorporated by reference herein in its entirety.

BACKGROUND OF THE INVENTION

1. Field of the Invention

The invention relates to an object pick-up system and method for picking up stacked objects.

2. Description of Related Art

Known in the art is an object pick-up system which can pick up bulk stacked objects in a container and place them at a predetermined location in a state with the objects aligned in direction (for example, Japanese Patent Publication No. 2014-87913A).

In the prior art, a vision sensor for the operation of picking up the objects and a vision sensor for the operation of aligning the picked up objects in direction have been considered necessary, so the hardware ends up becoming complicated. Therefore, art has been sought which uses a simpler configuration to place objects at a predetermined location aligned in direction.

SUMMARY OF INVENTION

In an aspect of the invention, an object pick-up system for picking up stacked objects comprises a robot hand able to grip an object, a manipulator which moves the robot hand, a vision sensor able to detect a position and posture of the object, and an arrangement determination part which determines a position and posture of the robot hand when the robot hand grips the object based on the position and posture of the object detected by the vision sensor.

Further, the object pick-up system comprises a manipulator controller which controls the manipulator so as to arrange the robot hand at the position and posture of the robot hand determined by the arrangement determination part, and a robot hand controller which controls the robot hand so as to grip the object.

The manipulator controller controls the manipulator so as to arrange the robot hand at a position and posture in which a moment is generated at the object when the robot hand gripping the object lifts up that object.

The robot hand controller controls the robot hand so as to allow the object to rotate relative to the robot hand by the action of gravity while preventing the object from dropping from the robot hand, when the robot hand is arranged at the position and posture in which the moment is generated at the object.

The object may be formed with a through hole at a position separated from a center of gravity of the object. The robot hand may include a plurality of claws and a claw driver which moves the plurality of claws in directions approaching and separating away from each other.

The arrangement determination part may determine the position and posture of the robot hand in which the plurality of claws can be arranged inside of the through hole. The robot hand controller may control the claw driver so as to move the plurality of claws in directions separating away from each other to press the plurality of claws against a wall surface which defines the through hole, thereby the object is gripped by the plurality of claws.

The robot hand controller may control the claw driver so as to move the plurality of claws in directions approaching each other to allow the object to rotate with respect to the robot hand, when the robot hand is arranged at the position and posture in which the moment is generated at the object.

The claws are arranged horizontally, or are arranged to be inclined with respect to the horizontal direction so that distal ends of the claws are positioned vertically upward with respect to proximal ends of the claws, when the robot hand is arranged at the position and posture in which the moment is generated at the object.

The robot hand may further include an arm attached to the manipulator and holding the plurality of claws. The plurality of claws may extend so as to be inclined with respect to the arm.

The arrangement determination part may determine the position and posture of the robot hand so that the robot hand can grip the object without the robot hand and the manipulator interfering with a surrounding member.

The robot hand controller may control the robot hand so as to grip the object so that the object cannot move relative to the robot hand, when the rotation of the object stops.

In another aspect of the invention, a method of gripping and picking up stacked objects by a robot hand comprises steps of detecting a position and posture of an object, determining a position and posture of the robot hand when the robot hand grips the object based on the detected position and posture of the object, arranging the robot hand at the determined position and posture of the robot hand, and gripping the object by the robot hand.

Further, the method comprises steps of arranging the robot hand at a position and posture in which a moment is generated at the object when the robot hand gripping the object lifts up that object, and rotating the object relative to the robot hand by the action of gravity while preventing the object from dropping from the robot hand, when the robot hand is arranged at the position and posture in which the moment is generated at the object.

BRIEF DESCRIPTION OF THE DRAWINGS

The above and other objects, features, and advantages of the invention will be clarified by the following description of preferred embodiments with reference to the attached drawings, in which.

DETAILED DESCRIPTION

Figure 1:
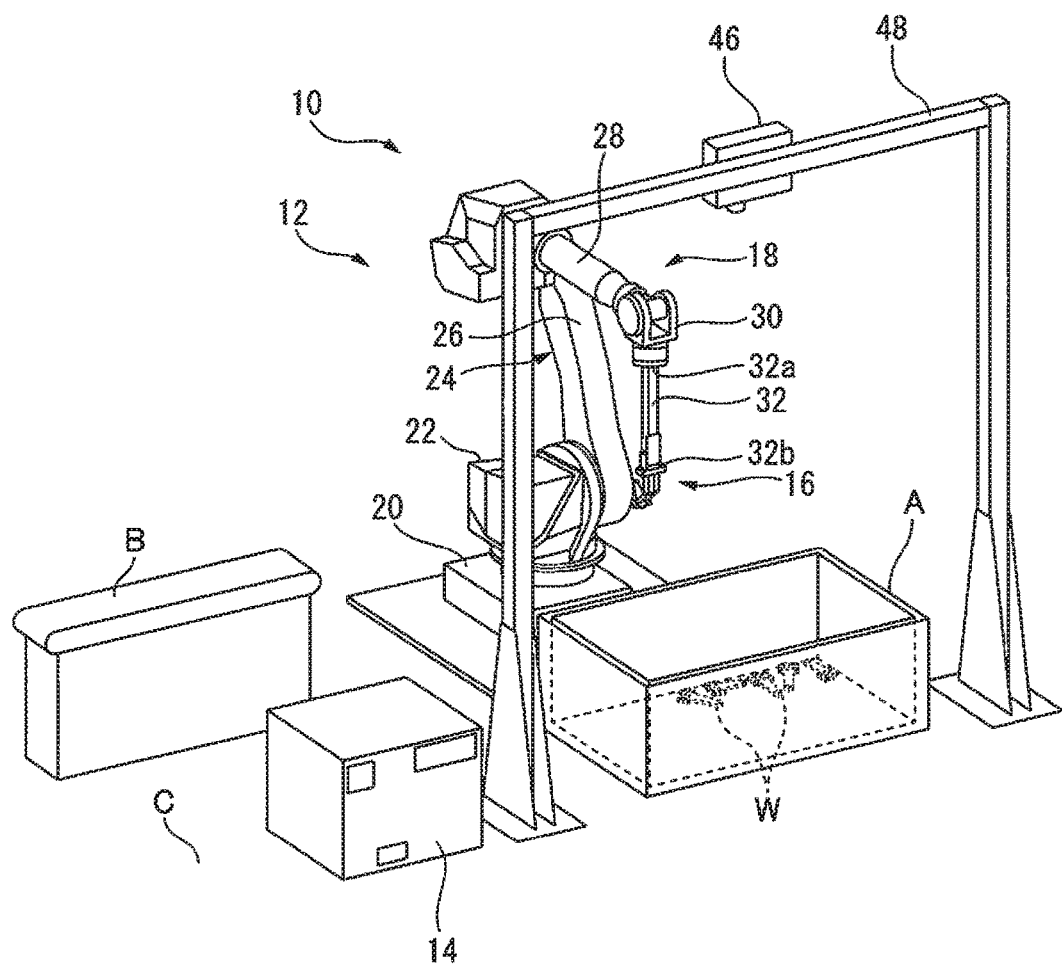
FIG. 1 is a perspective view of an object pick-up system according to an embodiment of the invention.

Below, embodiments of the invention will be explained in detail based on the drawings. First, referring to FIG. 1 and FIG. 2, an object pick-up system 10 according to an embodiment of the invention will be explained. The object pick-up system 10 is for picking up one of workpieces (objects) W stacked in a container A in bulk, and placing the picked-up workpiece W on a carrying table B.

The object pick-up system 10 includes a robot 12 and a robot controller 14 which controls the robot 12. The robot 12 is e.g. a vertical multi-articulated robot, and includes a robot hand 16 and a manipulator 18 which moves the robot hand 16.

The manipulator 18 includes a robot base 20, a rotary barrel 22, and a robot arm 24. The robot base 20 is fixed on a floor C of a work cell. The rotary barrel 22 is attached to the robot base 20 so as to be able to rotate about the vertical axis.

The robot arm 24 includes a rear arm 26 rotatably attached to the rotary barrel 22 and a forearm 28 rotatably attached to the distal end of the rear arm 26. The robot hand 16 is attached to the distal end of the forearm 28 via a wrist 30.

Figure 2:
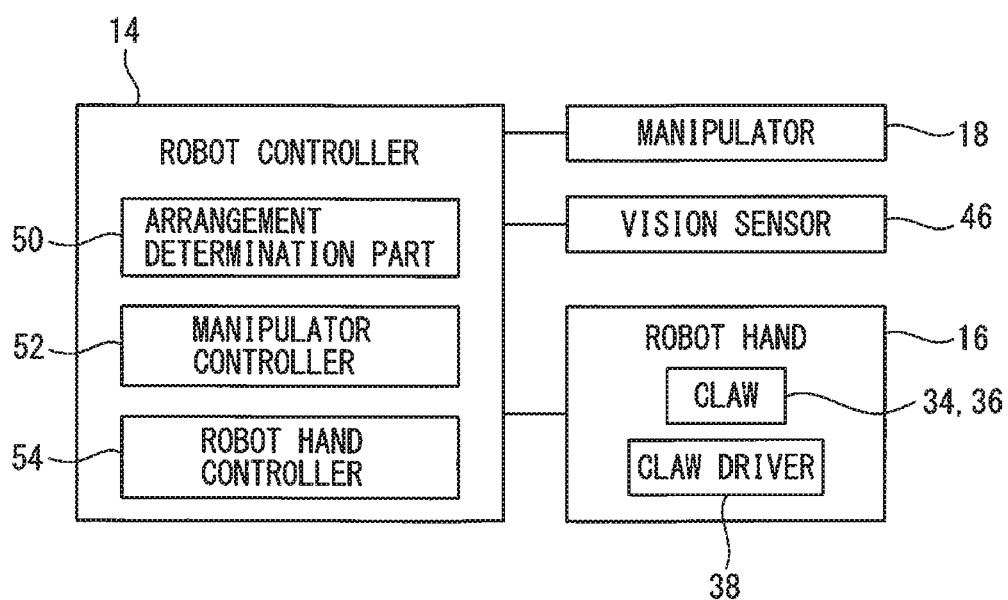
FIG. 2 is a block diagram of the object pick-up system shown in FIG. 1.

Next, referring to FIG. 1 to FIG. 3, the robot hand 16 will be explained. The robot hand 16 can grip and release the workpiece W. The robot hand 16 includes an arm 32, a first claw 34, a second claw 36, and a claw driver 38.

The arm 32 has a proximal end 32a coupled with the wrist 30 and a distal end 32b opposite to the proximal end 32a. The arm 32 extends linearly from the proximal end 32a to the distal end 32b along an axis $O_1$ (FIG. 3). A rail 40 is provided at the distal end 32b of the arm 32. The rail 40 is formed with a groove 40a extending along a y-axis direction shown in FIG. 3.

The first claw 34 is attached to the rail 40 via a claw holder 42. The first claw 34 is a rod member extending linearly along a z-axis direction shown in FIG. 3. The first claw 34 has a proximal end 34a fixed to the distal end of the claw holder 42 and a distal end 34b opposite to the proximal end 34a.

The claw holder 42 extends so as to be substantially parallel to the arm 32 (i.e., the axis $O_1$). The claw holder 42 is attached to the rail 40 so as to be able to slide along the groove 40a of the rail 40.

The second claw 36 is attached to the rail 40 via a claw holder 44. The second claw 36 is a rod member extending linearly along the z-axis direction in FIG. 3. The second claw 36 is arranged at a position separate from the first claw 34 in the y-axis direction in FIG. 3. The second claw 36 has a proximal end 36a fixed to the distal end of the claw holder 44 and a distal end 36b opposite to the proximal end 36a.

The claw holder 44 extends so as to be substantially parallel to the arm 32 (i.e., the axis $O_1$). The claw holder 44 is attached to the rail 40 so as to be able to slide along the groove 40a of the rail 40.

The claw driver 38 is comprised of e.g. a pneumatic or hydraulic cylinder, or a servo motor. The claw driver 38 moves the claw holders 42 and 44 in directions approaching each other and separating away from each other along the y-axis in FIG. 3, in accordance with a command from the robot controller 14.

Figure 3:
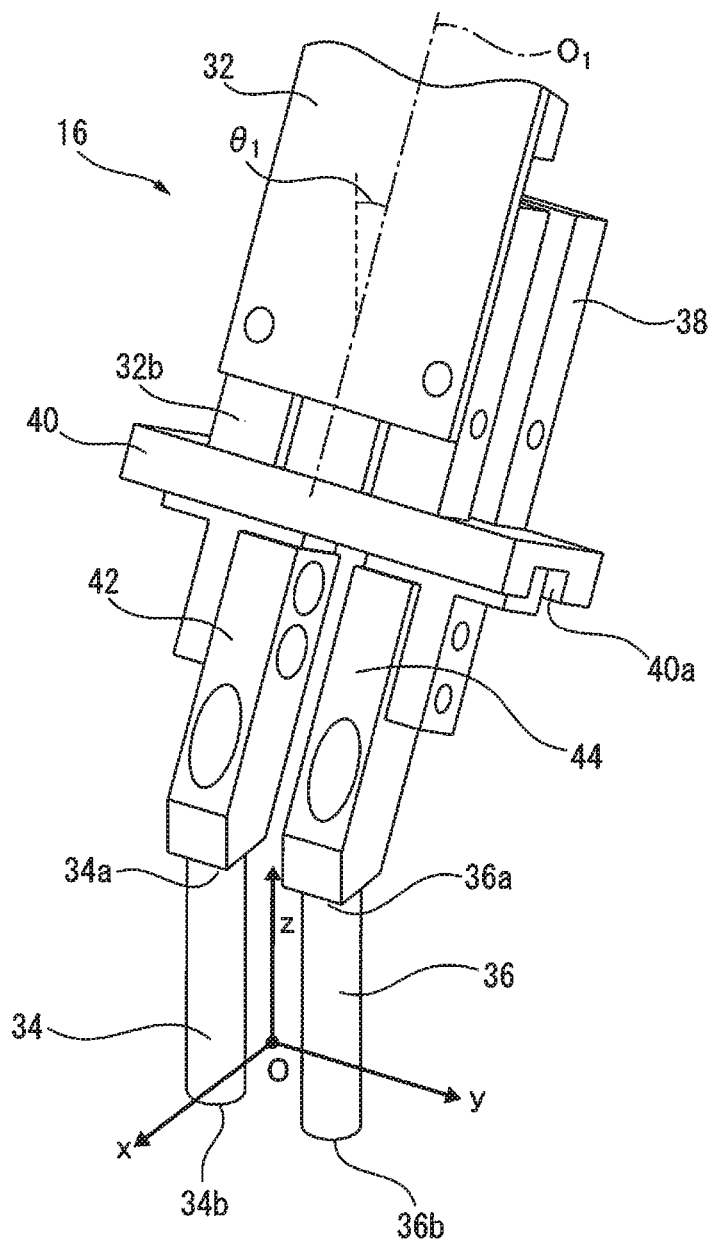
FIG. 3 is an enlarged view of the robot hand shown in FIG. 1.

Thus, the first claw 34 and the second claw 36 are moved by the claw driver 38 in directions approaching each other and separating away from each other along the y-axis in FIG. 3.

As an example, if the claw driver 38 is comprised of a cylinder, the claw driver 38 includes a tubular cylinder body, a piston rod reciprocally arranged in the cylinder body, and a motion conversion mechanism which converts the reciprocating motion of the piston rod into the open/close motion of the claw holders 42 and 44 along the y-axis direction. A magnet is embedded in the piston rod. On the other hand, a magnetic sensor (so-called lead switch) is attached to the cylinder body.

The magnetic sensor detects the magnetic field which is generated by the magnet embedded in the piston rod and which changes in response to the displacement of the piston rod. The magnetic sensor sends data of the magnetic field to the robot controller 14. The robot controller 14 can detect the distance between the first claw 34 and the second claw 36 based on the data received from the magnetic sensor.

In this embodiment, the first claw 34 and the second claw 36 extend so as to be inclined with respect to the arm 32. Specifically, the extension direction of the first claw 34 and the second claw 36 (i.e., the z-axis direction) is inclined with respect to the axis $O_1$ of the arm 32 by an angle $\theta_1$. The angle $\theta_1$ is set to e.g. $0° < \theta_1 < 90°$.

The robot controller 14 pre-records the Cartesian coordinate system shown in FIG. 3 as a tool coordinate system of the robot hand 16. The position and posture of the robot hand 16 in a 3D space can be defined by a 3D coordinates of an origin O, the x-axis direction, y-axis direction, and z-axis direction of the tool coordinate system. The origin O is arranged at a position between the first claw 34 and the second claw 36 and between the proximal end 34a (proximal end 36a) and distal end 34b (distal end 36b).

Figure 4:
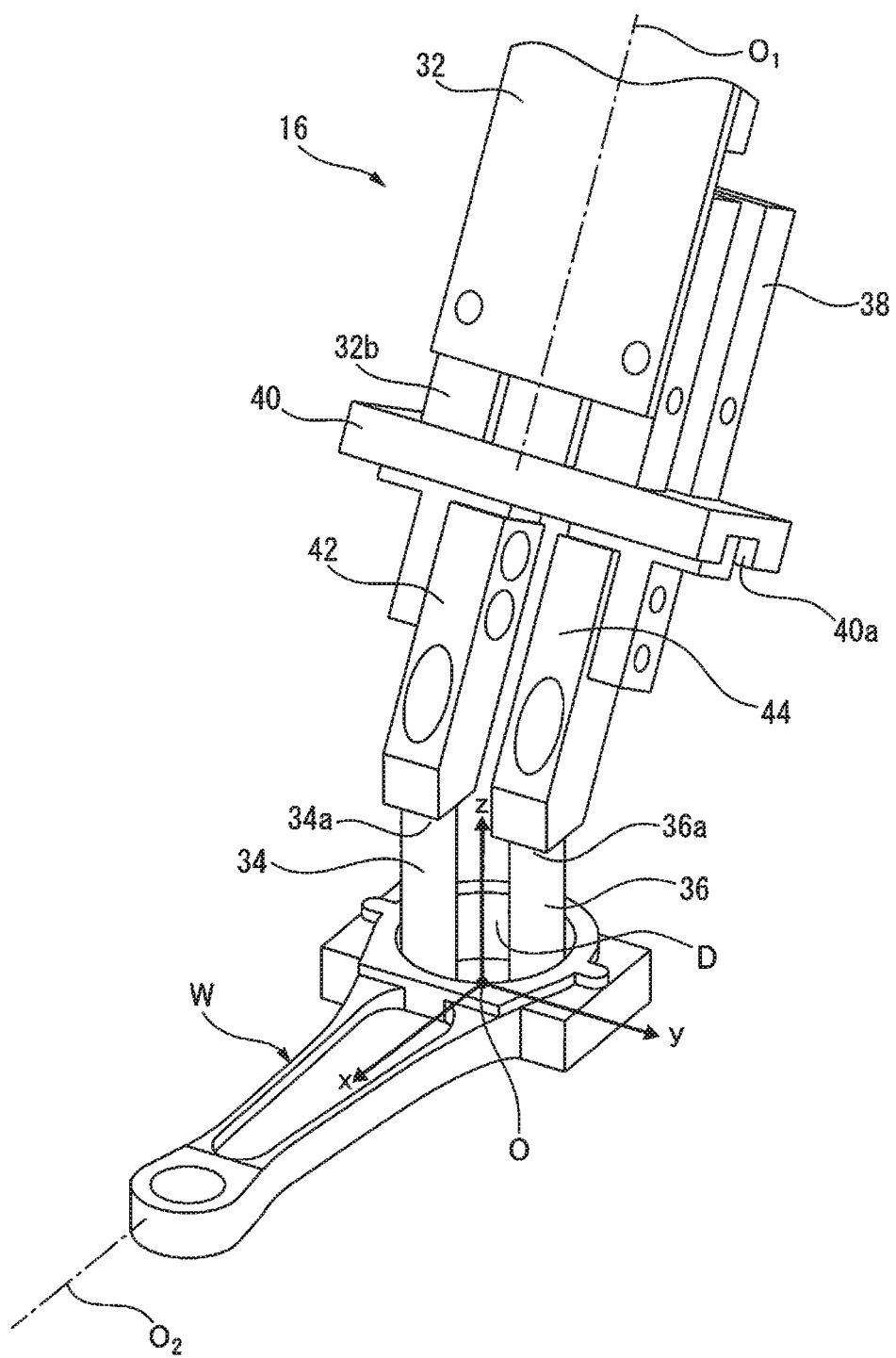
FIG. 4 shows an example of a state where the robot hand shown in FIG. 3 grips a workpiece.

FIG. 4 shows an example of a state where the robot hand 16 grips the workpiece W. As shown in FIG. 4, the workpiece W in this embodiment is an elongated member extending along the axis $O_2$ of the longitudinal direction.

In the example shown in FIG. 4, the robot hand 16 is positioned with respect to the workpiece W so that the x-axis of the tool coordinate system is parallel to the axis $O_2$ of the longitudinal direction of the workpiece W, the z-axis of the tool coordinate system of the robot hand 16 is parallel to the thickness direction of the workpiece W, and the y-axis of the tool coordinate system is parallel to the width direction of the workpiece W.

The workpiece W is formed with a circular through hole D. The through hole D is formed at a position separated from a center of gravity of the workpiece W, and extends through the workpiece W in the thickness direction of the workpiece W (i.e., the z-axis direction in FIG. 4).

When the robot hand 16 grips the workpiece W as shown in FIG. 4, the first claw 34 and the second claw 36 are inserted into the through hole D, and then the claw driver 38 moves them in directions separating away from each other.

As a result, the first claw 34 and the second claw 36 are pressed against a wall surface which defines the through hole D. Thereby, the workpiece W is gripped by the first claw 34 and the second claw 36.

Referring again to FIG. 1 and FIG. 2, the object pick-up system 10 further includes a vision sensor 46. The vision sensor 46 is held vertically upward of the container A by a holding frame 48. The vision sensor 46 is e.g. a 3D vision sensor, and detects the positions and postures of the workpieces W piled in the container A in accordance with a command from the robot controller 14. Specifically, the vision sensor 46 images the workpieces W in the container A for several times, and measures the distances between the vision sensor 46 and the workpieces W based on the image data. Then, the vision sensor 46 calculates the 3D coordinates of the workpieces W, thereby detects the positions and postures of the workpieces W in a 3D space. The vision sensor 46 sends the data of the detected positions and postures of the workpieces W to the robot controller 14.

Figure 5:
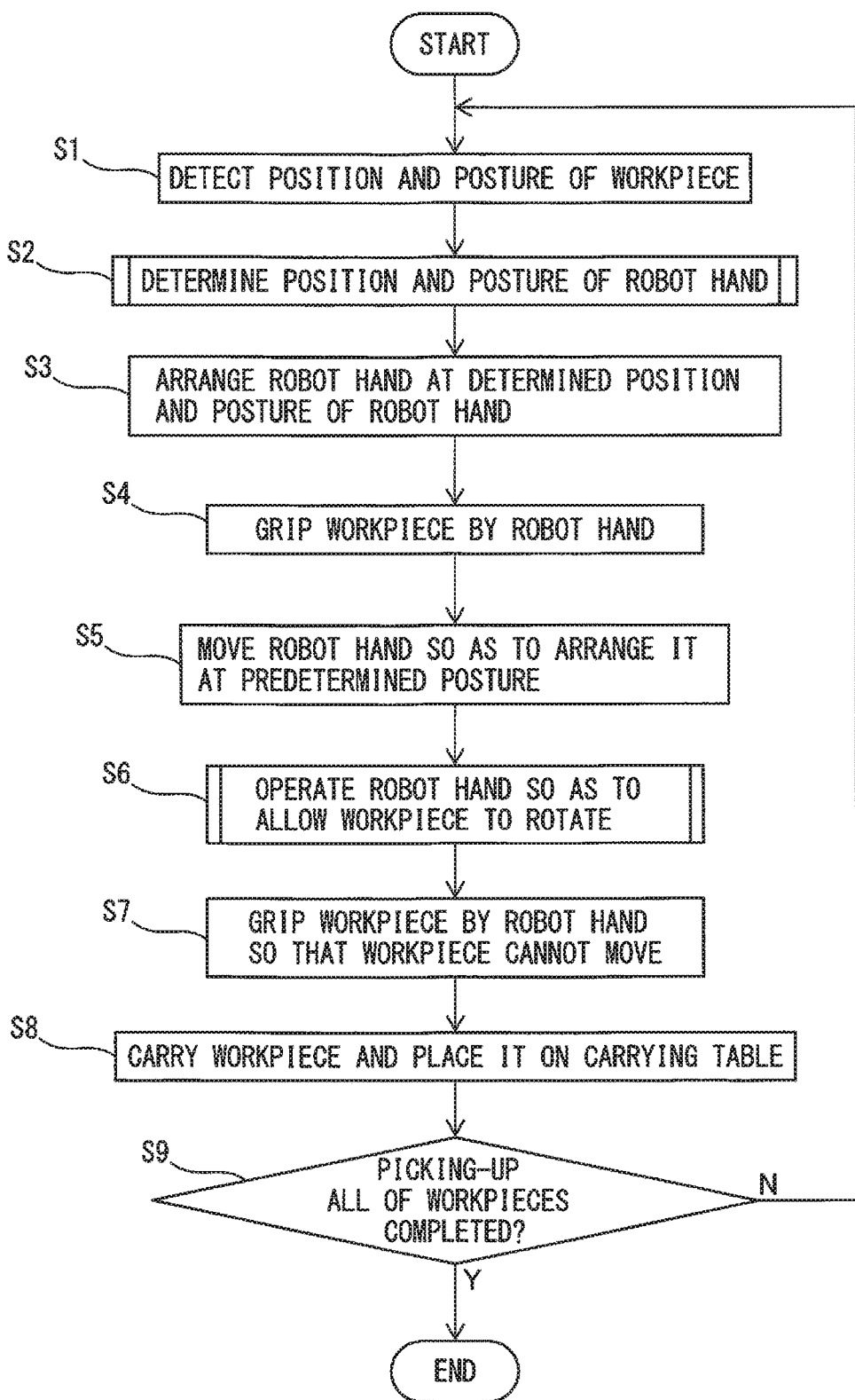
FIG. 5 is a flow chart of an example of an operation flow of the object pick-up system shown in FIG. 1.

Next, referring to FIG. 1 to FIG. 7, the operation of the object pick-up system 10 will be explained. FIG. 5 shows an example of the operation flow of the object pick-up system 10. The flow shown in FIG. 5 is started when the robot controller 14 receives a command for picking-up the workpiece W from the user or host controller.

At step S1, the robot controller 14 detects positions and postures of the workpieces W through the vision sensor 46. Specifically, the robot controller 14 sends a command to the vision sensor 46 so as to image the workpieces W stacked in the container A, and detects the positions and postures of the workpieces W in 3D space. The vision sensor 46 sends data of the detected positions and postures of the workpieces W to the robot controller 14.

At step S2, the robot controller 14 determines a position and posture of the robot hand 16, in which the robot hand 16 can appropriately grip one of the workpieces W, based on the positions and postures of the workpieces W detected at step S1.

Figure 6:
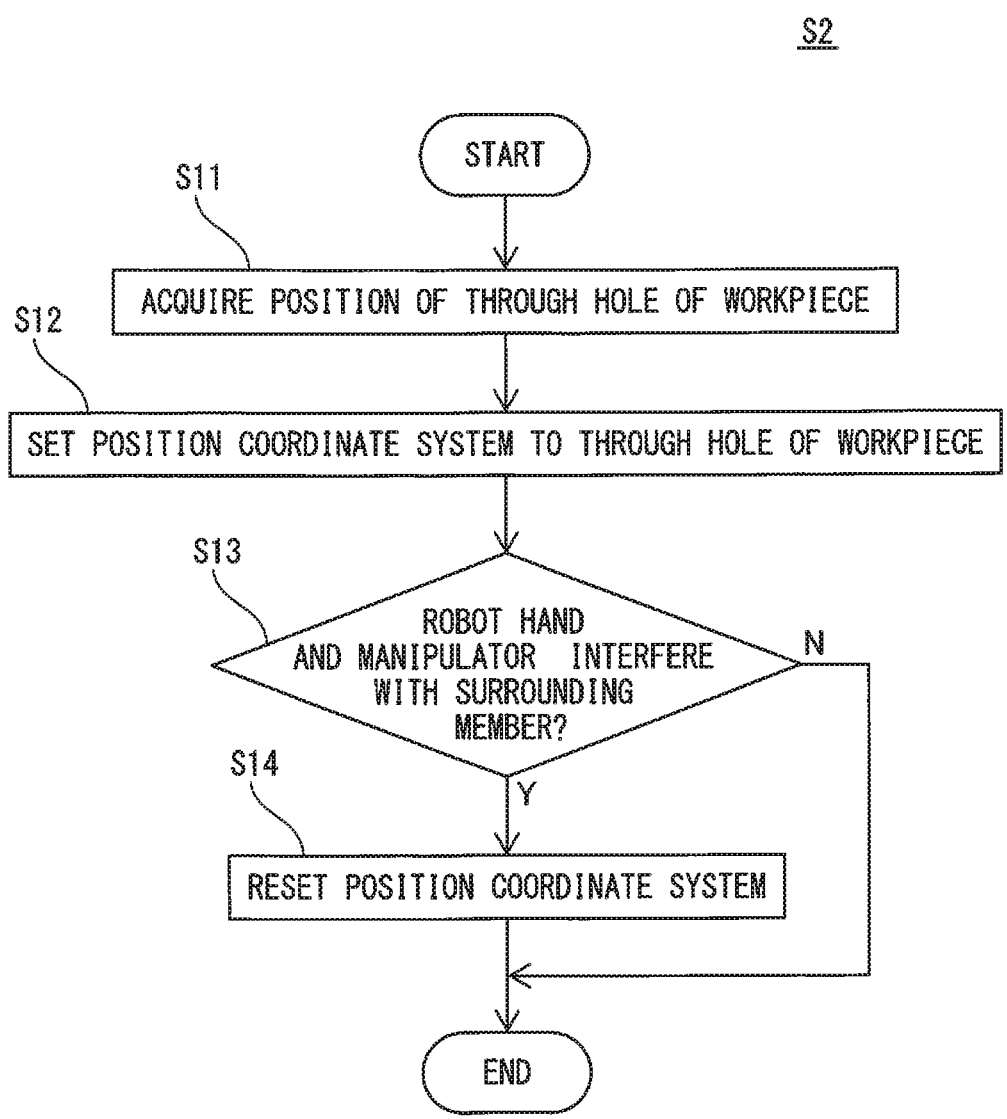
FIG. 6 is a flow chart of step S3 shown in FIG. 5.

This step S2 will be explained with reference to FIG. 6. After step S2 is started, at step S11, the robot controller 14 acquires a position of the through hole D of a workpiece W. Specifically, the robot controller 14 refers to the data received from the vision sensor 46 at step S1 to specify one workpiece W to be picked up, and acquires the coordinates of the center position of the through hole D of the one workpiece W.

At step S12, the robot controller 14 sets a position coordinate system of the workpiece W to the through hole D of the workpiece W to be picked up. The position coordinate system of the workpiece W is a target coordinate system to which the tool coordinate system of the robot hand 16 is to be positioned when the robot hand 16 grips the workpiece W. As an example, the robot controller 14 sets the position coordinate system of the workpiece W to the through hole D as the Cartesian coordinate system shown in FIG. 4.

In this case, the origin O of the position coordinate system coincides with the coordinates of the center position of the through hole D acquired at step S11. Further, the x-axis direction of the position coordinate system is parallel with the axis $O_2$ of the longitudinal direction of the workpiece W. Further, the z-axis direction of the position coordinate system is parallel with the thickness direction of the workpiece W, while the y-axis direction of the position coordinate system is parallel with the width direction of the workpiece W.

Figure 8:
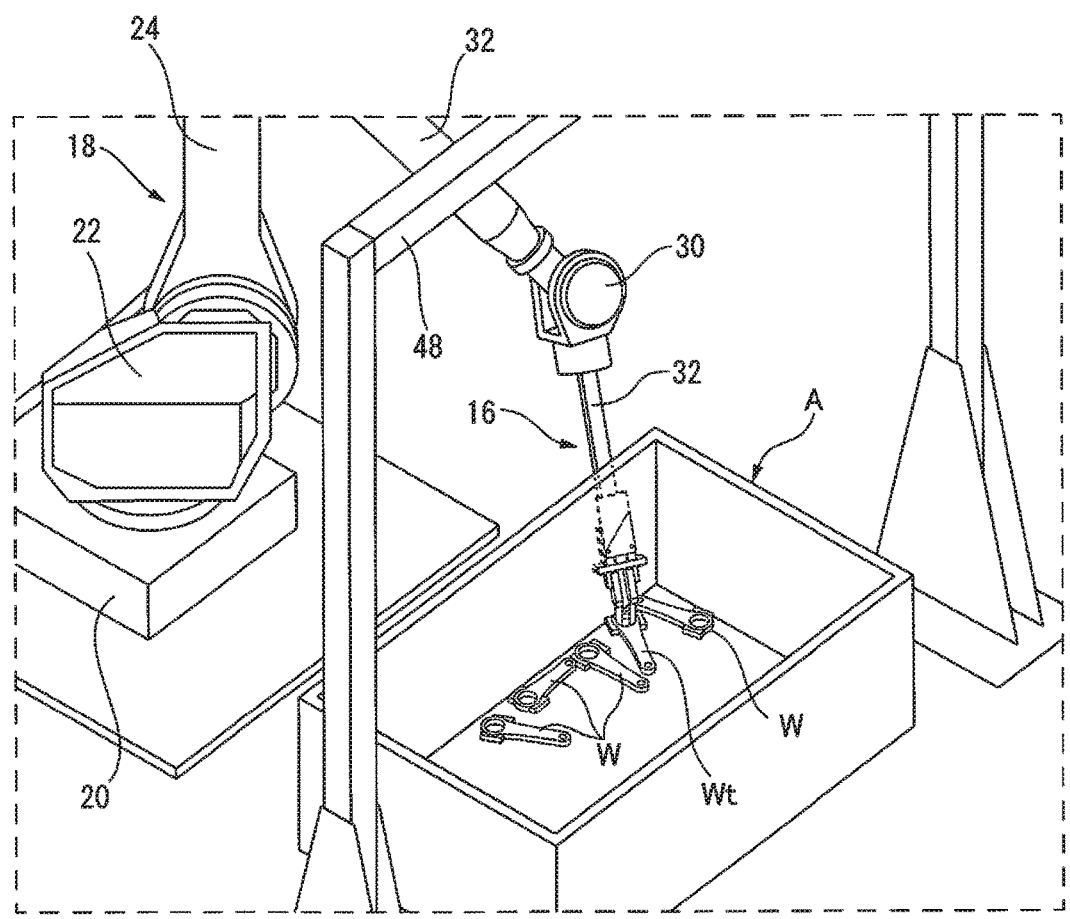
FIG. 8 shows a state where the robot hand interferes with a container.

At step S13, the robot controller 14 judges whether the robot hand 16 and manipulator 18 interfere with a surrounding member. This operation will be explained with reference to FIG. 8 and FIG. 9.

Assuming that, the robot controller 14 has specified the workpiece $W_t$ to be picked up from the plurality of workpieces W stacked in the container A. In this case, the robot controller 14 moves the robot hand 16 so that the tool coordinate system of the robot hand 16 coincides with the position coordinate system set for the workpiece $W_t$, when positioning the robot hand 16 with respect to the workpieces W.

Figure 9:
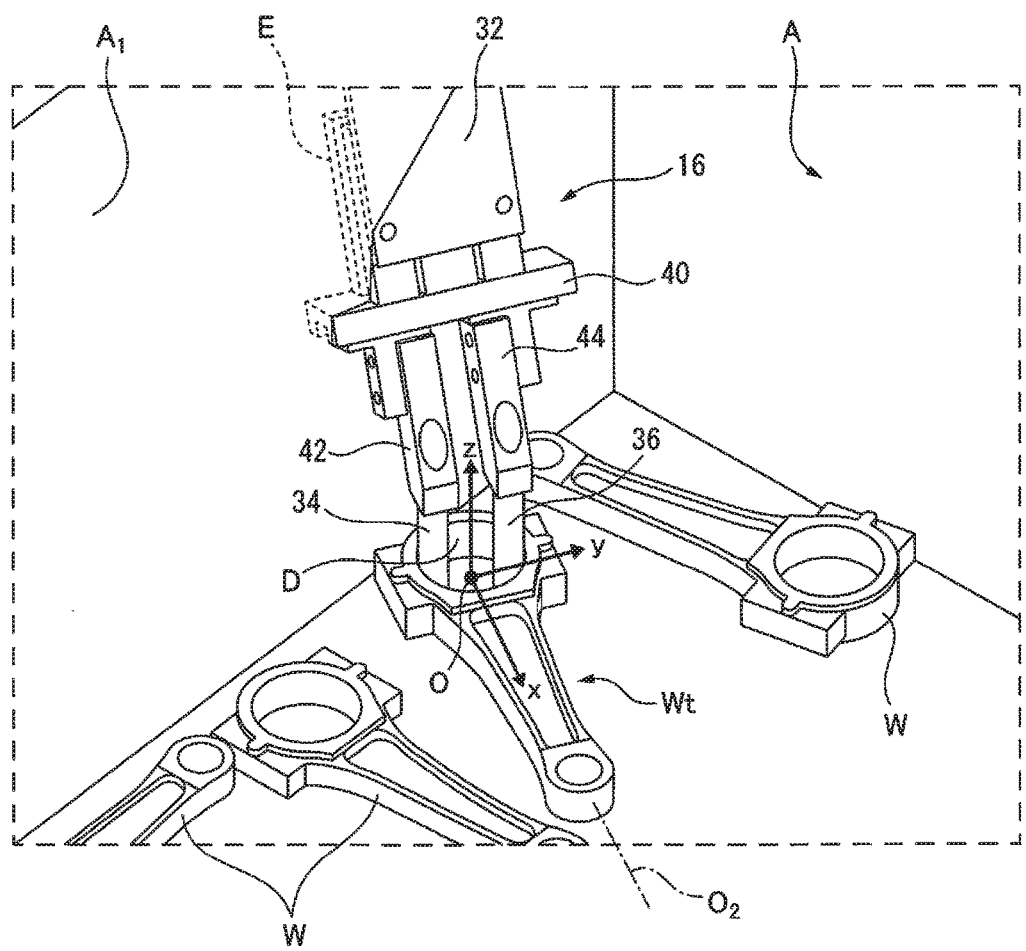
FIG. 9 is an enlarged view of a relevant part in FIG. 8.

If the position coordinate system is set to the through hole D of the workpiece $W_t$ to be picked up as shown in FIG. 4 and the robot hand 16 is positioned with respect to the workpiece $W_t$ so as to match the tool coordinate system with the position coordinate system, the robot hand 16 is positioned with respect to the workpiece $W_t$ as shown in FIG. 9.

When the robot hand 16 is positioned in this way, a part of the robot hand 16 indicated by the dotted line E in FIG. 9 interferes with a side wall $A_1$ of the container A. Therefore, the robot hand 16 cannot be arranged with respect to the workpiece $W_t$ appropriately, when the position coordinate system of workpiece is set to the workpiece $W_t$ as shown in FIG. 9.

Therefore, in this embodiment, at this step S13, the robot controller 14 judges whether the interference as stated above occurs when arranging the robot hand 16 so as to match the tool coordinate system with the position coordinate system set at step S12.

As an example, model data of the container A (i.e., data of the 3D coordinates of the container A) is pre-recorded in a memory (not shown). On the other hand, the robot controller 14 calculates model data of the robot hand 16 (i.e., the data of the 3D coordinates of the robot hand 16) when the robot hand 16 is arranged at the position coordinate system set at step S12.

Then, the robot controller 14 compares the model data of the container A with the model data of the robot hand 16, and judges whether the interference between the container A and the robot hand 16 occurs.

Similarly, the memory pre-records model data of not only the container A but also a member present around the robot 12 (e.g., the holding frame 48). Further, the robot controller 14 compares the model data of the surrounding member with the model data of the robot hand 16, and judges whether interference between the surrounding member and the robot hand 16 occurs.

When the robot controller 14 judges that the robot hand 16 interferes with the surrounding member including the container A (i.e., judges "YES"), the robot controller 14 proceeds to step S14. On the other hand, when the robot controller 14 judges that the robot hand 16 does not interfere with the surrounding member (i.e., judges "NO"), the flow shown in FIG. 6 is ended.

At step S14, the robot controller 14 resets the position coordinate system of the workpieces W. Specifically, the robot controller 14 rotates the position coordinate system set as shown in FIG. 9 about the z-axis of the position coordinate system.

Then, along with rotating the position coordinate system about the z-axis, the robot controller 14 continually calculates the model data of the robot hand 16 when arranged at the rotated position coordinate system, and judges the interference between the model data of the robot hand 16 and the model data of the surrounding member including the container A.

When the position coordinate system is rotated to a position where no interference between the model data of the robot hand 16 and the model data of the surrounding member occurs, the robot controller 14 sets this rotated position coordinate system as a new position coordinate system, again.

Figure 10:
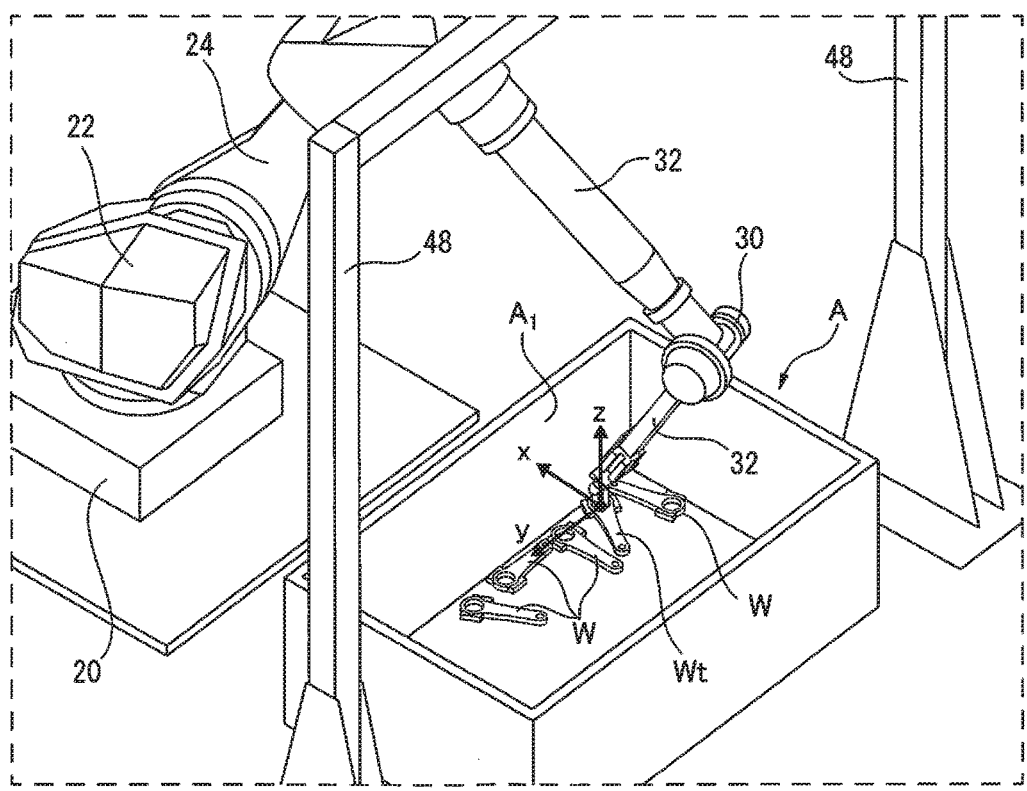
FIG. 10 shows a state where the robot hand is arranged at a position coordinate system after reset.
Figure 11:
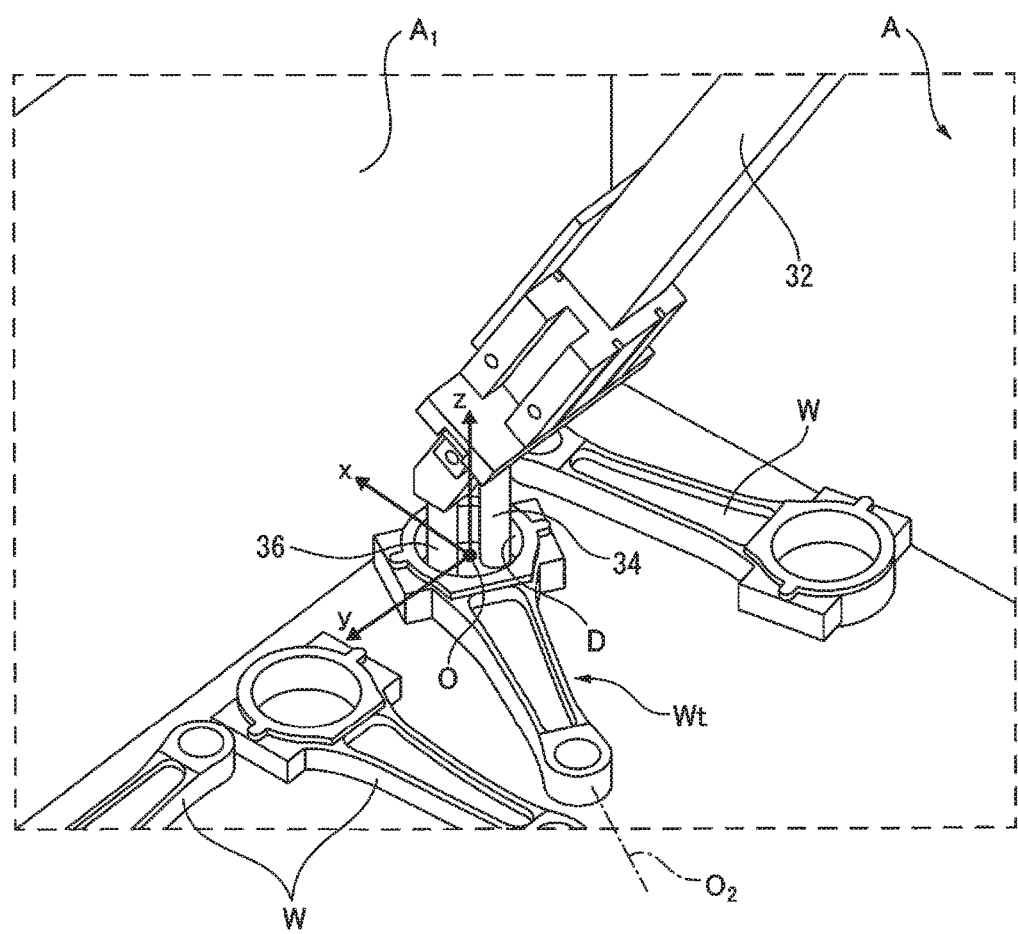
FIG. 11 is an enlarged view of a relevant part in FIG. 10.

An example of the thus reset position coordinate system is shown in FIG. 10 and FIG. 11. The reset position coordinate system shown in FIG. 10 and FIG. 11 is rotated about the z-axis from the original position coordinate system shown in FIG. 9 by approximately 150° when viewed from the z-axis plus direction in FIG. 9.

If the robot hand 16 is positioned so as to match the tool coordinate system with this reset position coordinate system, as shown in FIG. 10 and FIG. 11, the robot hand 16 and manipulator 18 no longer interfere with the side wall $A_1$ of the container A. As a result, the first claw 34 and the second claw 36 can be suitably arranged inside of the through hole D of the workpiece $W_t$.

Thus, the robot controller 14 determines the position and posture of the robot hand 16, in which the robot hand 16 can appropriately grip the workpieces W, based on the position and posture of the workpiece $W_t$ detected by the vision sensor 46 at step S2. Therefore, in this embodiment, the robot controller 14 has a function of an arrangement determination part 50 (FIG. 2) which determines the position and posture of the robot hand 16.

Referring again to FIG. 5, at step S3, the robot controller 14 controls the manipulator 18 so as to arrange the robot hand 16 at the position and posture of the robot hand 16 determined at step S2.

As a result, the robot hand 16 is positioned with respect to the workpiece $W_t$ to be gripped as shown in FIG. 10 and FIG. 11, thereby the first claw 34 and the second claw 36 are inserted inside of the through hole D of the workpiece $W_t$. Thus, in this embodiment, the robot controller 14 has a function of a manipulator controller 52 (FIG. 2) which controls the manipulator.

At step S4, the robot controller 14 controls the robot hand 16 so as to grip the workpiece $W_t$. Specifically, the robot controller 14 sends a command to the claw driver 38 so as to move the first claw 34 and the second claw 36 in directions separating away from each other.

As a result, the first claw 34 and the second claw 36 are pressed against the wall surface which defines the through hole D of the workpiece $W_t$. Due to this, the workpiece $W_t$ is gripped by the first claw 34 and the second claw 36. Thus, in this embodiment, the robot controller 14 has a function of a robot hand controller 54 (FIG. 2) which controls the robot hand 16.

At step S5, the robot controller 14 controls the manipulator 18 so as to move the robot hand 16 so that the robot hand 16 is arranged at a predetermined posture. An example of the posture at which the robot hand 16 is arranged at step S5 is shown in FIG. 12 to FIG. 14.

Figure 12:
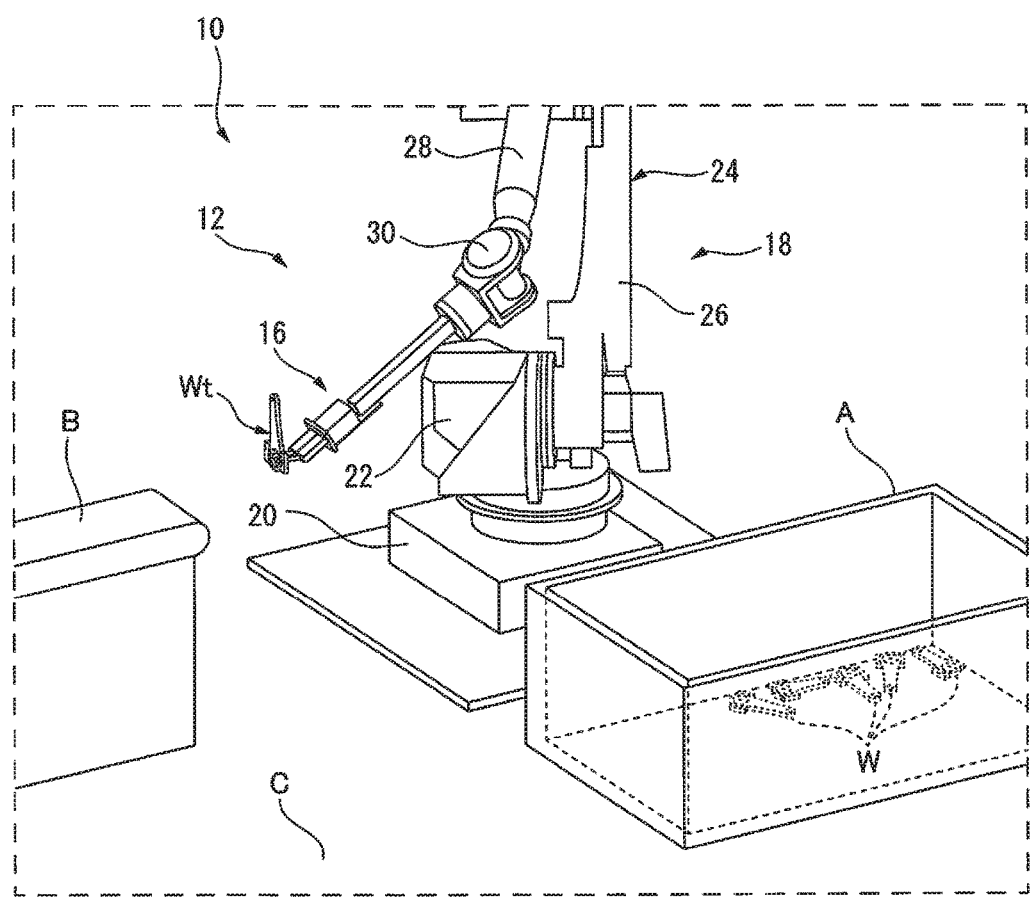
FIG. 12 shows an example of the posture of the robot hand at step S5 in FIG. 5.
Figure 13:
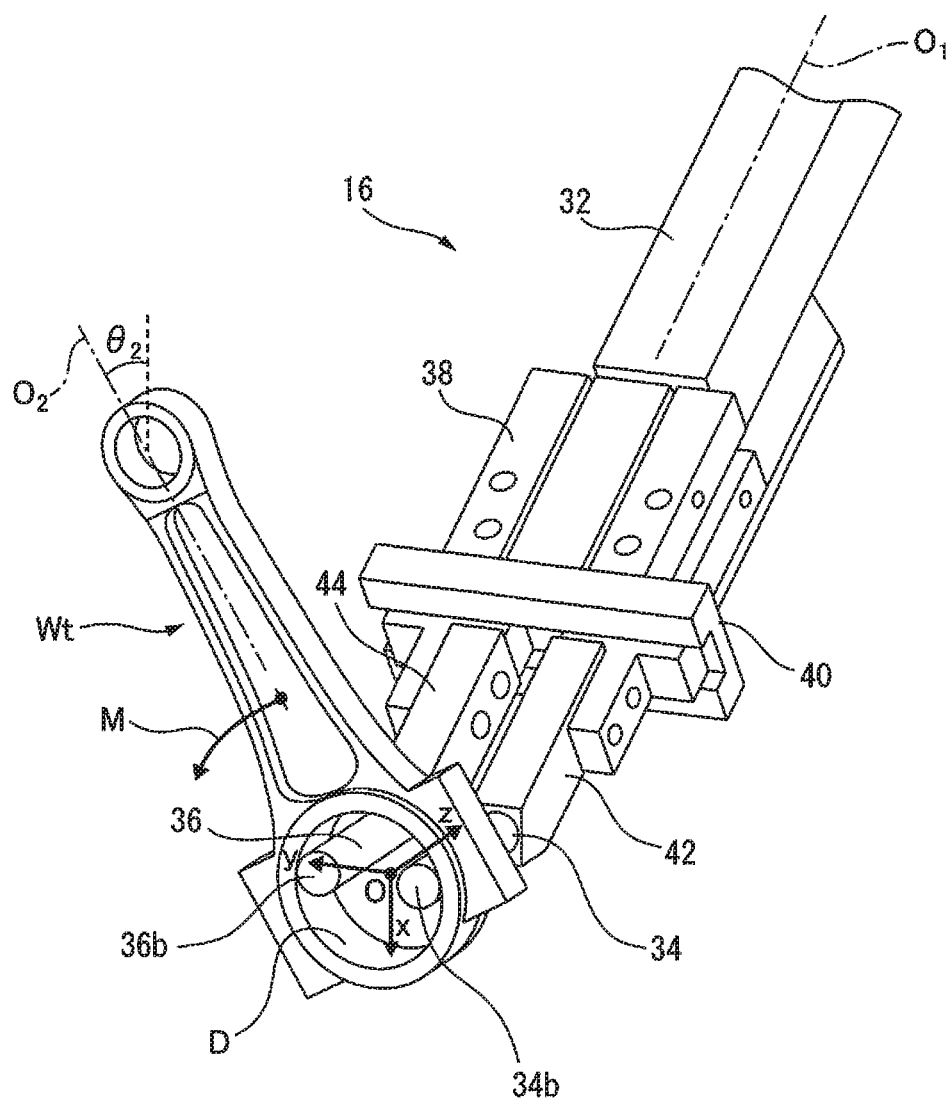
FIG. 13 is an enlarged view of the robot hand and workpiece shown in FIG. 12.
Figure 14:
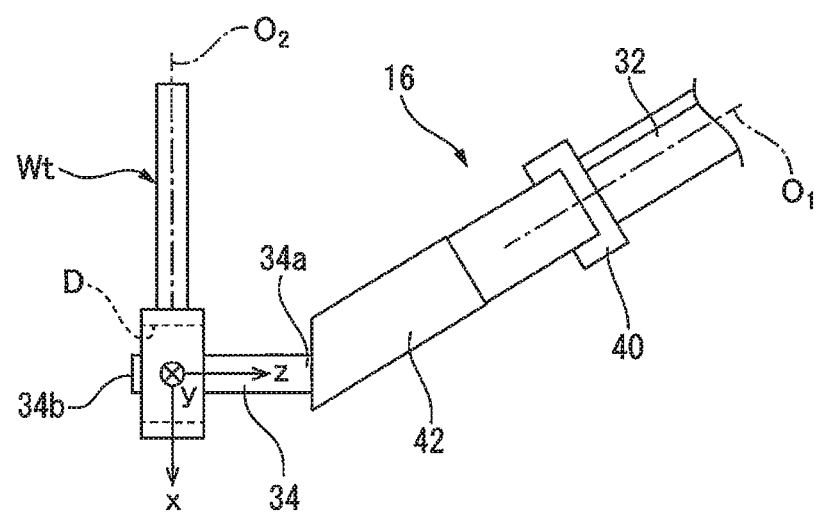
FIG. 14 is a side view of the robot hand shown in FIG. 13 as seen from a y-axis direction in FIG. 13.

In the state shown in FIG. 12 to FIG. 14, the first claw 34 and the second claw 36 are arranged substantially horizontally. In other words, the robot hand 16 is arranged so that the z-axis and y-axis of the tool coordinate system of the robot hand 16 is substantially horizontal, while the x-axis direction of the tool coordinate system coincides with the vertically downward direction. At this time, as shown in FIG. 13, the axis $O_2$ of the longitudinal direction of the workpiece W is inclined with respect to the vertical direction (i.e., x-axis) by an angle $\theta_2$.

At this step S5, the robot controller 14 controls the manipulator 18 so as to move the robot hand 16 gripping the workpiece $W_t$ from the position shown in FIG. 10 to the position shown in FIG. 12. Along with this movement, the robot controller 14 arranges the robot hand 16 at the posture as shown in FIG. 13 and FIG. 14.

As explained above, the through hole D of the workpiece $W_t$ is formed at a position separated from the center of gravity of the workpiece W. Therefore, when the first claw 34 and the second claw 36 grip the wall surface of the through hole D at the posture shown in FIG. 13, a rotational moment M about the origin O is generated at the workpiece $W_t$ due to the action of gravity, as shown by the arrow M in FIG. 13.

At step S6, the robot controller 14 operates the robot hand 16 so as to allow the workpiece $W_t$ to rotate with respect to the robot hand 16 by the action of gravity.

This step S6 will be explained referring to FIG. 7. After step S6 is started, at step S21, the robot controller 14 moves the first claw 34 and the second claw 36. Specifically, the robot controller 14 sends a command to the claw driver 38 so as to move the first claw 34 and the second claw 36 in directions approaching each other.

At step S22, the robot controller 14 judges whether the first claw 34 and the second claw 36 are suitably arranged at the target positions. As an example, if the claw driver 38 is comprised of a cylinder, at this step S22, the robot controller 14 receives data of the magnetic field of the magnet embedded in the piston rod from the above-mentioned magnetic sensor.

Then, based on the data received from the magnetic sensor, the robot controller 14 judges whether the distance between the first claw 34 and the second claw 36 is a predetermined target distance. When the distance between the first claw 34 and the second claw 36 is the target distance, the first claw 34 and the second claw 36 approach each other slightly by a predetermined distance, compared with the arrangement at the end of step S4.

The robot controller 14 judges that the first claw 34 and the second claw 36 are suitably arranged at the target positions when it detects that the distance between the first claw 34 and the second claw 36 is the target distance.

As another example, if the claw driver 38 is comprised of a servo motor, at this step S22, the robot controller 14 judges whether the servo motor is rotated in a first direction by predetermined rotation numbers from the start of step S21.

When the servo motor is rotated in the first direction by the predetermined rotation numbers, the first claw 34 and the second claw 36 approach each other slightly by a predetermined distance, compared with the arrangement at the end of step S4.

The robot controller 14 judges that the first claw 34 and the second claw 36 are suitably arranged at the target positions when it detects that the servo motor is rotated in the first direction by the predetermined rotation numbers.

As still another example, if the claw driver 38 is comprised of a servo motor, the robot controller 14 judges whether a load torque (or feedback current) of the servo motor is a predetermined target value.

When the load torque of the servo motor is the target value, the first claw 34 and the second claw 36 approach each other slightly by a predetermined distance, compared with the arrangement at the end of step S7. That is, the target value of the load torque is set to be smaller than the load torque at the end of step S7.

The robot controller 14 judges that the first claw 34 and the second claw 36 are suitably arranged at the target positions when it detects that the load torque of the servo motor is the target value. Note that, the above-mentioned predetermined target distance, rotation numbers of the servo motor, and target value of the load torque can be defined in advance by e.g. an experimental or simulation method.

When the robot controller 14 judges that the first claw 34 and the second claw 36 are suitably arranged at the target positions (i.e., judges "YES"), it proceeds to step S23. On the other hand, when the robot controller 14 judges that the first claw 34 and the second claw 36 are not suitably arranged at the target positions (i.e., judges "NO"), it loops step S22.

At step S23, the robot controller 14 sends a command to the claw driver 38 so as to stop the movement of the first claw 34 and the second claw 36.

By carrying out steps S21 to S23, the first claw 34 and the second claw 36 slightly approach each other by a predetermined distance, thereby the forces by which the first claw 34 and the second claw 36 is pressed against the wall surface defining the through hole D are reduced.

As explained above, at the end of step S5, the first claw 34 and the second claw 36 are arranged substantially horizontally and the rotational moment M shown in FIG. 13 is generated at the workpiece $W_t$.

Therefore, when the forces for pressing the first claw 34 and the second claw 36 against the wall surface of the through hole D are reduced, the workpiece $W_t$ rotates in the direction of the arrow M in FIG. 13 by the action of gravity while the workpiece $W_t$ is hooked by the first claw 34 and the second claw 36.

In this way, according to this embodiment, the workpiece $W_t$ is allowed to rotate with respect to the robot hand 16 by the action of gravity while the workpiece $W_t$ is prevented from dropping from the first claw 34 and the second claw 36. As a result, the workpiece $W_t$ is hanged at the first claw 34 and the second claw 36.

In this state, the center of gravity of the workpiece $W_t$ is positioned vertically downward of the first claw 34 and the second claw 36 (or origin O), and the axis $O_2$ in the longitudinal direction of the workpiece $W_t$ is parallel to the x-axis of the tool coordinate system of the robot hand 16 (i.e., the vertical direction).

Figure 15:
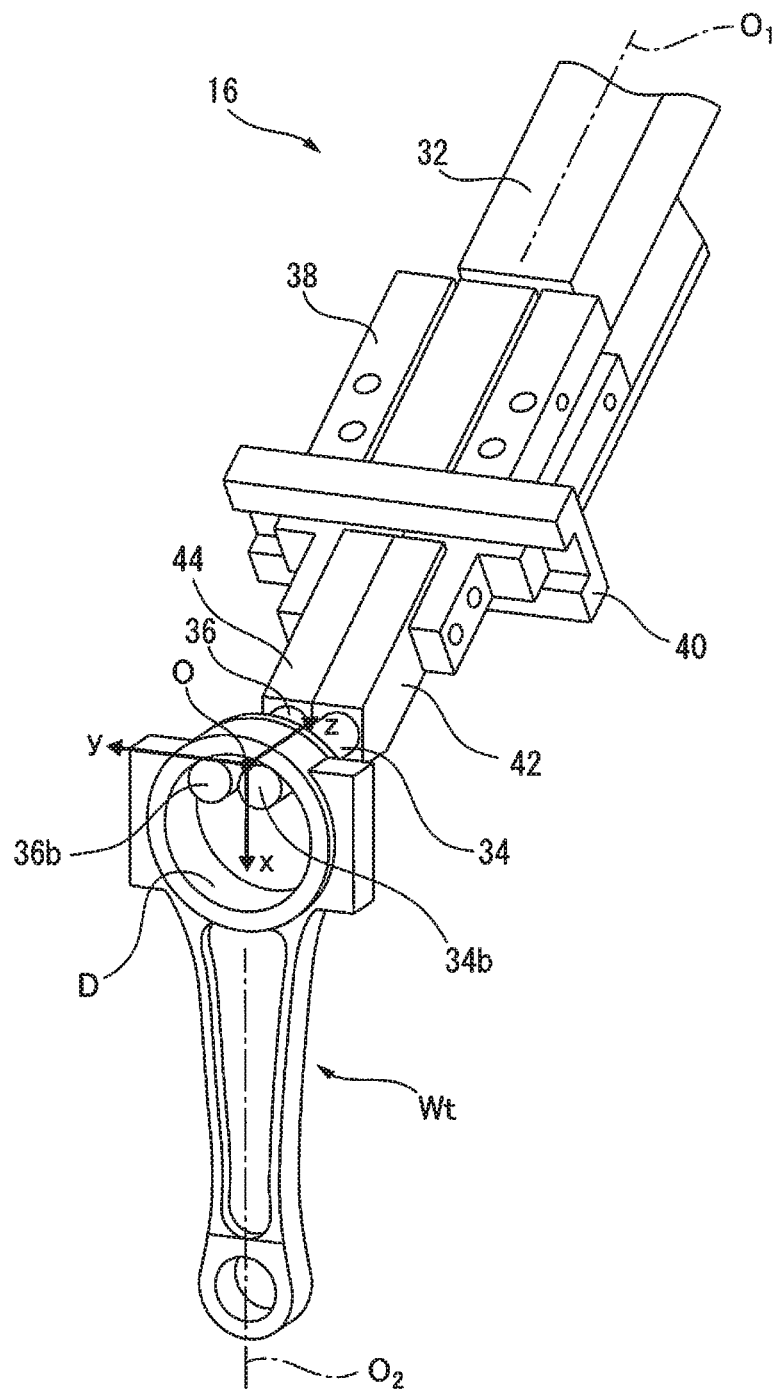
FIG. 15 shows the robot hand and workpiece after step S6 in FIG. 5.

Further, the z-axis of the tool coordinate system of the robot hand 16 is parallel to the thickness direction of the workpiece W, while the y-axis of the tool coordinate system is parallel to the width direction of the workpiece W. In other words, the posture of the workpiece $W_t$ with respect to the robot hand 16 (or the tool coordinate system) shown in FIG. 15 is the same as the posture shown in FIG. 4.

At step S24, the robot controller 14 judges whether the rotation of the workpiece $W_t$ with respect to the robot hand 16 has ended. As an example, the robot controller 14 judges that the rotation of the workpiece $W_t$ with respect to the robot hand 16 has ended when a predetermined time (e.g., one second) has elapsed from the time when it judged "YES" at step S22 or when step S23 is ended.

As another example, the robot controller 14 monitors a load torque of a servo motor built in the manipulator 18 from the end of step S23, and judges that the rotation of the workpiece $W_t$ with respect to the robot hand 16 has ended when the fluctuations in the load torque has converged.

As still another example, a force sensor capable of measuring the force applied to the manipulator 18 is attached. In this case, the robot controller 14 monitors the force measured by the force sensor from the end of step S23, and judges that the rotation of the workpiece $W_t$ with respect to the robot hand 16 has ended when the fluctuations in the measured force has converged.

Figure 7:
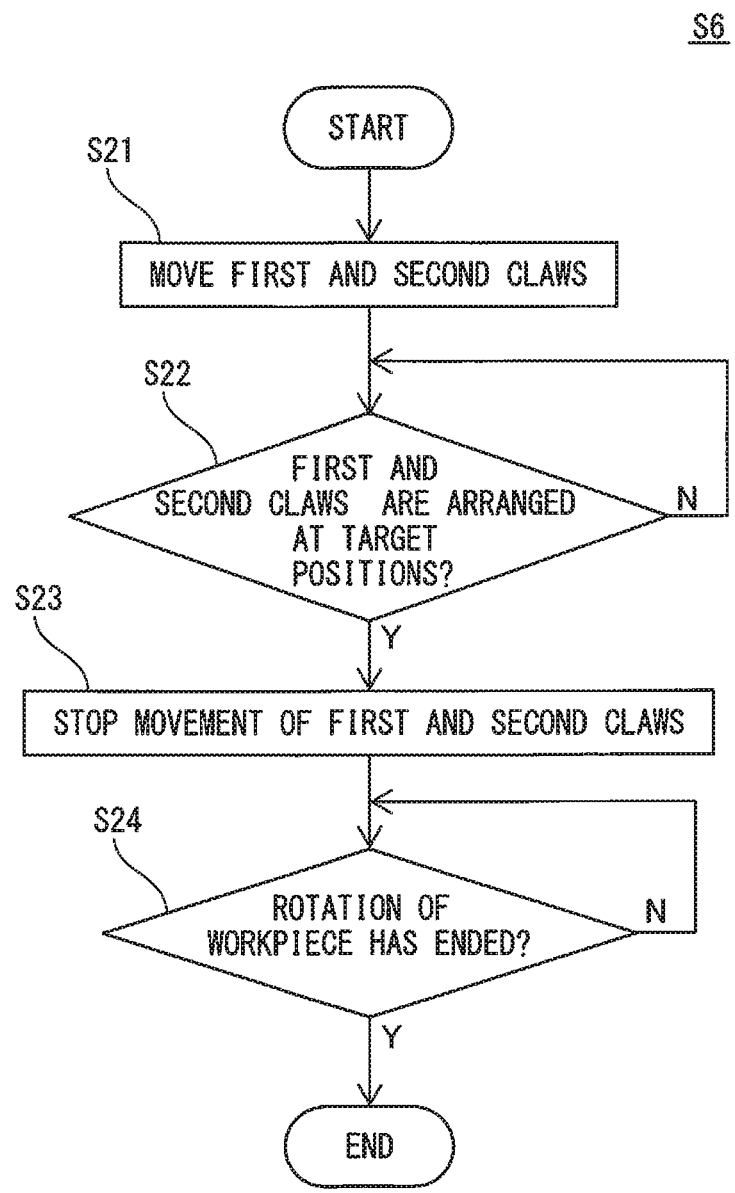
FIG. 7 is a flow chart of step S6 shown in FIG. 5.

Thus, by carrying out step S6 shown in FIG. 7, the posture of the workpiece $W_t$ with respect to the robot hand 16 can be changed from the posture shown in FIG. 13 to the posture shown in FIG. 15.

Referring again to FIG. 5, at step S7, the robot controller 14 controls the robot hand 16 so as to grip the workpiece $W_t$ so that the workpiece $W_t$ cannot move relative to the robot hand 16. Specifically, the robot controller 14 sends a command to the claw driver 38 so as to move the first claw 34 and the second claw 36 move in directions separating away from each other.

As a result, the first claw 34 and the second claw 36 are pressed against the wall surface defining the through hole D of the workpiece $W_t$, as in step S4. Thereby, the workpiece $W_t$ is immovably gripped by the first claw 34 and the second claw 36.

At step S8, the robot controller 14 controls the manipulator 18 and the robot hand 16 so as to place the workpiece $W_t$ on the carrying table B. Specifically, the robot controller 14 controls the manipulator 18 so as to arrange the robot hand 16 at a posture in which the x-axis and y-axis of the tool coordinate system of the robot hand 16 are horizontal while the z-axis direction coincides with the vertically upward direction (i.e., the posture shown in FIG. 4).

Figure 17:
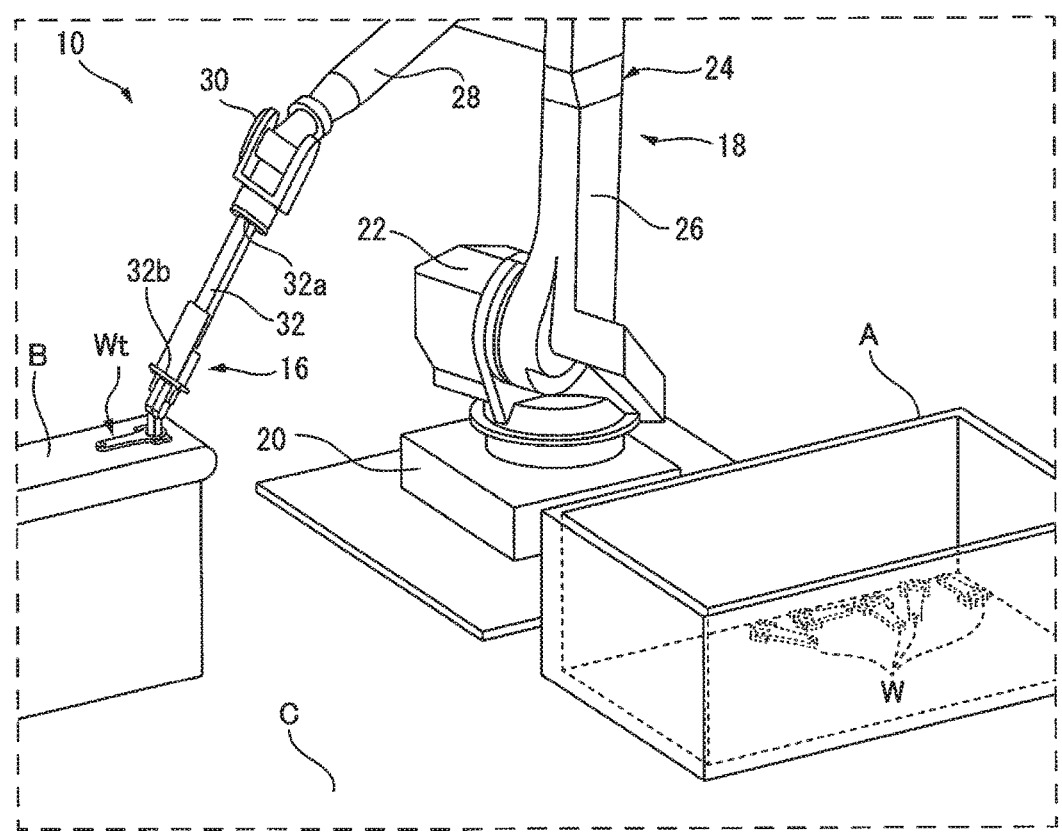
FIG. 17 is a perspective view of the object pick-up system after step S8 in FIG. 5.

Then, the robot controller 14 places the workpiece $W_t$ on the carrying table B. This state is shown in FIG. 17. Then, the robot controller 14 sends a command to the claw driver 38 so as to move the first claw 34 and the second claw 36 in directions approaching each other, thereby release the first claw 34 and the second claw 36 from the wall surface of the through hole D. As a result, the workpiece $W_t$ is placed on the carrying table B with the posture shown in FIG. 17.

At step S9, the robot controller 14 judges whether picking-up all of the workpieces W has been completed. When the robot controller 14 judges that there is another workpiece W to be picked up from the container A (i.e., judges "NO"), it returns to step S1. On the other hand, when the robot controller 14 judges that all of the workpieces W have been picked up from the container A (i.e., judges "YES"), it ends the flow shown in FIG. 5.

According to this embodiment, the robot controller 14 changes the posture of the workpiece $W_t$ with respect to the robot hand 16 by the action of gravity, at step S6. Due to this configuration, even if the robot hand 16 picks up respective workpieces $W_t$ from the container A with various postures, the postures of respective workpieces $W_t$ with respect to the robot hand 16 can be easily matched.

More specifically, at step S2, the robot controller 14 determines the position coordinate system of the workpieces W so that the robot hand 16 and manipulator 18 do not interfere with the surrounding member, and arranges the robot hand 16 so as to match the tool coordinate system with the position coordinate system. In this case, for each of the workpieces W piled in the container A, the posture of the workpiece W (i.e., the angle $\theta_2$ shown in FIG. 13) when picked up by the robot hand 16 changes.

Figure 16:
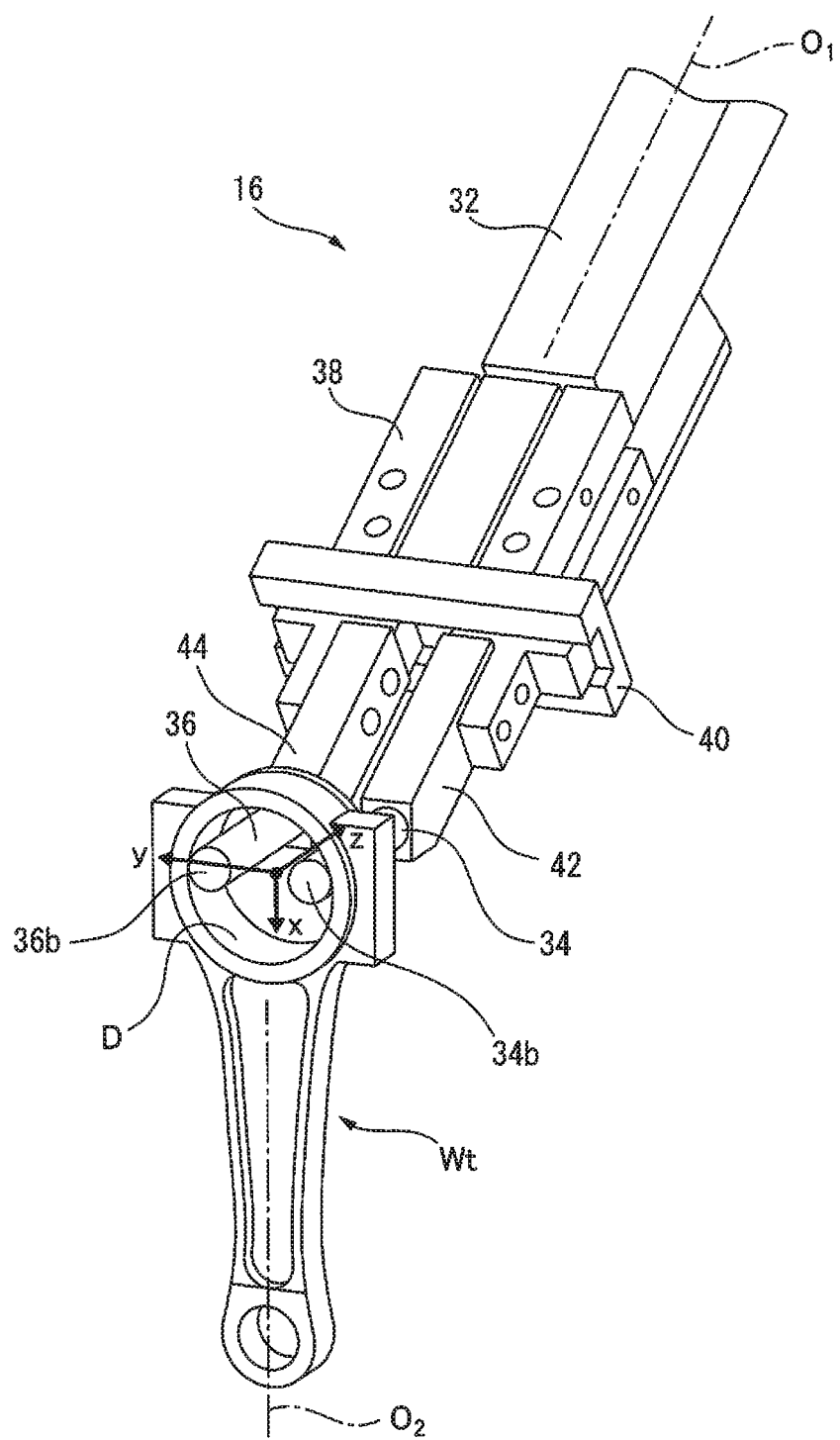
FIG. 16 shows the robot hand and workpiece after step S7 in FIG. 5.

Even if the angle $\theta_2$ changes in this way, the robot controller 14 can modify the posture of the picked-up workpiece W relative to the robot hand 16 so as to coincide with the posture shown in FIG. 16 by carrying out step S6. Accordingly, the robot controller 14 can place workpieces W on the carrying table B with the same postures (orientations) at step S8.

Further, according to this embodiment, since the posture of the picked-up workpiece W is modified by the action of gravity, it is not necessary to provide an additional device, such as a vision sensor, in order to modify the posture of the workpiece W. Therefore, it is possible to modify the postures of the workpieces W so as to coincide with each other by a simpler hardware.

Note that, at step S5, the robot controller 14 may arrange the first claw 34 and the second claw 36 so as to be inclined with respect to the horizontal direction so that the distal ends 34b and 36b of the first claw 34 and the second claw 36 are respectively arranged vertically upward of the proximal ends 34a and 36a.

According to this configuration, it is possible to prevent the workpiece $W_t$ from dropping from the first claw 34 and the second claw 36 when the workpiece $W_t$ is rotated relative to the robot hand 16 at step S6.

Figure 18:
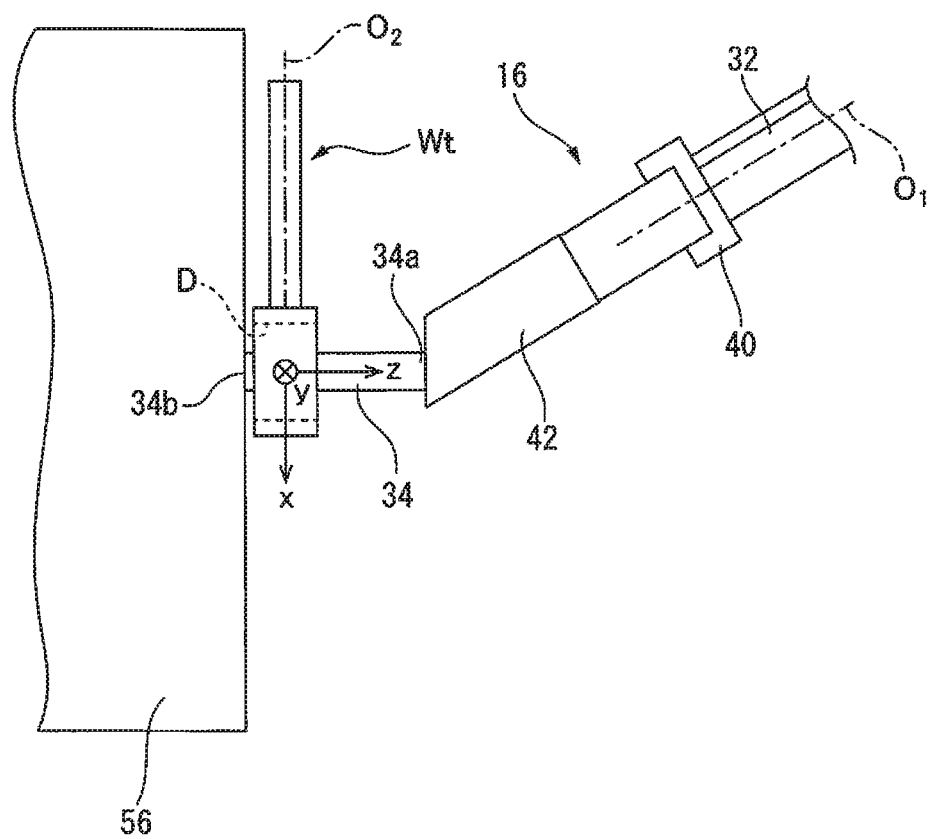
FIG. 18 is a view for explaining another embodiment of step S5 in FIG. 5.

Further, at step S5, the robot controller 14 may contact the distal ends 34b and 36b of the first claw 34 and the second claw 36 with other member. Such an embodiment is shown in FIG. 18.

In this embodiment, the robot controller 14 contacts the distal ends 34b and 36b of the first claw 34 and the second claw 36 with an outer surface of a fixed object 56 at step S5. The outer surface of the fixed object 56 has an area larger than the through hole D of the workpiece W.

According to this configuration, it is possible to effectively prevent the workpiece $W_t$ from dropping from the first claw 34 and the second claw 36 when the workpiece $W_t$ is rotated relative to the robot hand 16 at step S6.

Figure 19:
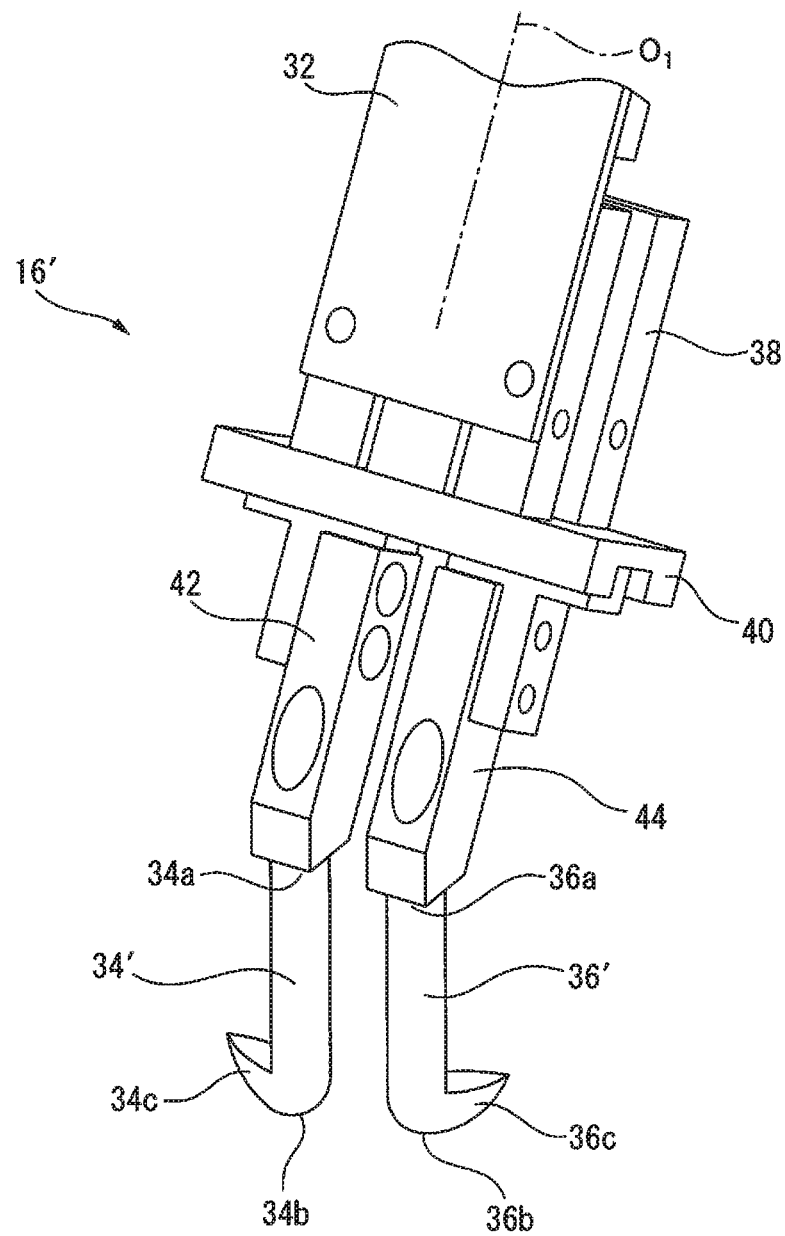
FIG. 19 is a view of a robot hand of another embodiment of the invention.
Figure 20:
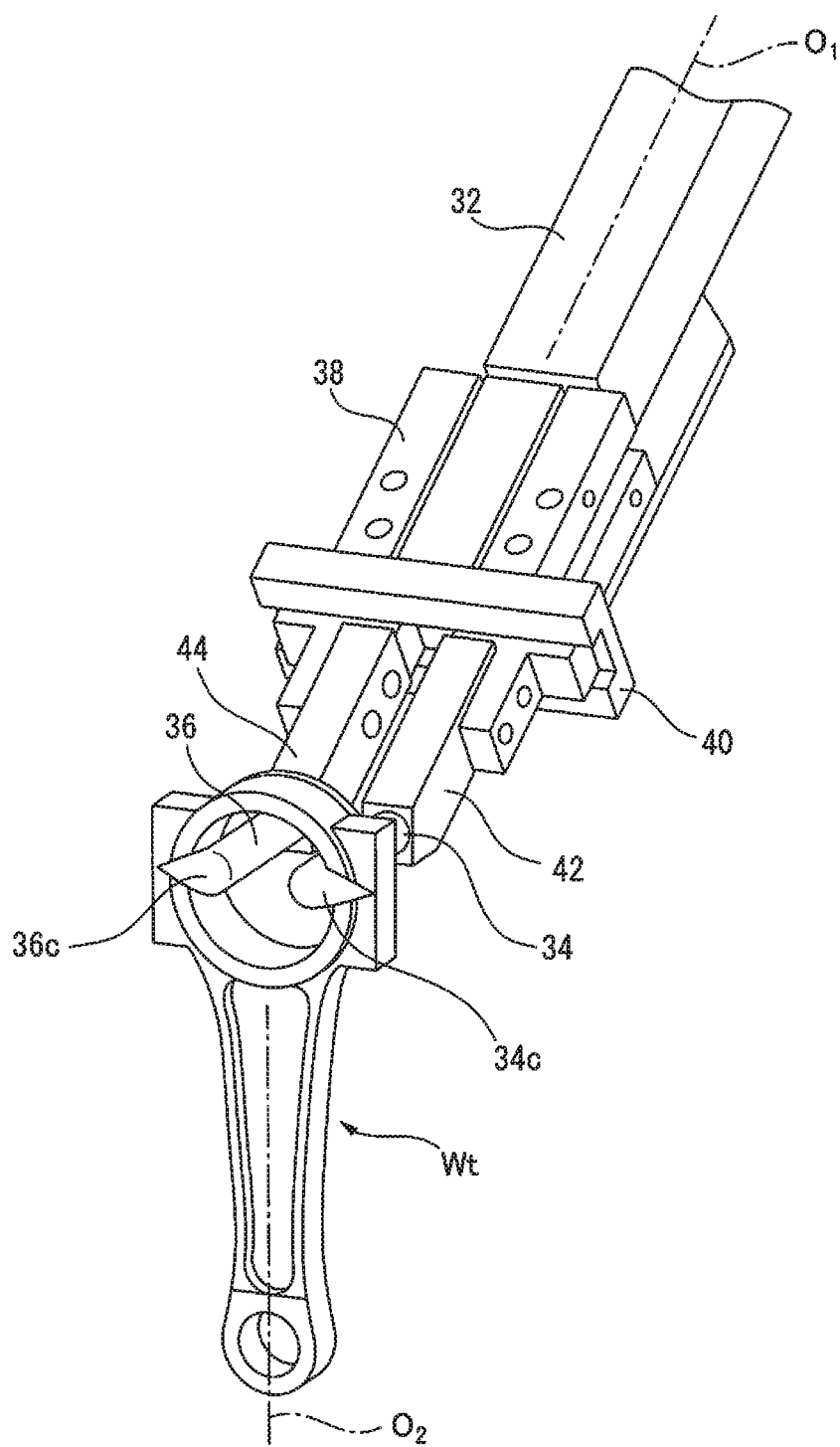
FIG. 20 shows a state where the robot hand shown in FIG. 19 grips a workpiece.

Further, the first claw 34 and the second claw 36 may be formed with elements for preventing dropping of the workpiece $W_t$. Such an embodiment is shown in FIG. 19 and FIG. 20. In this embodiment, the robot hand 16' includes a first claw 34' and second claw 36'.

The distal ends 34b and 36b of the first claw 34' and the second claw 36' are respectively formed with outwardly projecting hooks 34c and 36c. When the robot hand 16' of this embodiment grips the workpiece $W_t$ at the above-mentioned step S4, the hooks 34c and 36c engage with the workpiece $W_t$ as shown in FIG. 20.

According to this configuration, it is possible to effectively prevent the workpiece $W_t$ from dropping from the first claw 34' and the second claw 36' when the robot hand 16' grips the workpiece $W_t$.

Further, the outer surface of the claw 34, 34', 36, 36' may be formed with a layer for increasing a friction coefficient, such as a rubber layer, in order to increase the friction coefficient between the claw 34, 34', 36, 36' and the workpiece W. According to this configuration, it is possible to effectively prevent the workpiece W from dropping from the claw 34, 34', 36, 36' when the workpieces W is rotated relative to the robot hand 16, 16'.

Further, the robot controller 14 may control the manipulator 18 so as to slightly swing the robot hand 16, after the above-mentioned step S23 or in parallel with steps S21 to S23. According to this configuration, it is possible to facilitate the rotation of the workpieces W with respect to the robot hand 16.

More specifically, if the angle $\theta_2$ shown at FIG. 13 is 0° for example, the workpieces W may not rotate even if step S21 has been carried out. In this case, it is advantageous to swing the robot hand 16 so as to facilitate the rotation of the workpieces W.

Further, in the above-mentioned embodiments, the robot hand 16 includes two claws 34 and 36. However, the robot hand 16 may include three or more claws.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, it should be noted that the operations, routines, steps, stages, and other processing in the device, system, program, and method in the claims, specification, and drawings can be realized in any order, unless clearly indicated by "before", "in advance of", etc., or the output of prior processing being used for later processing. In the flow of operations in the claims, specification, and drawings, even if explained using "first", "next", "then", etc., for convenience, this does not mean the execution in this order is essential.

The invention claimed is:

1. An object pick-up system for picking up stacked objects, the object pick-up system comprising:
   a robot hand configured to grip an object;
   a manipulator which moves the robot hand;
   a vision sensor configured to detect a position and posture of the object;
   an arrangement determination part which determines a position and posture of the robot hand when the robot hand grips the object based on the position and the posture of the object detected by the vision sensor;
   a manipulator controller which controls the manipulator so as to arrange the robot hand at the position and posture of the robot hand determined by the arrangement determination part; and
   a robot hand controller which controls the robot hand so as to grip the object so that the object is immovable with respect to the robot hand,
   wherein
   the manipulator controller controls the manipulator so as to arrange the robot hand as a position and posture in which a moment is generated at the object when the robot hand gripping the object lifts up the object,
   the robot hand controller controls the robot hand so as to decrease a force, by which the robot hand grips the object, after the robot hand is arranged at the position and posture in which the moment is generated at the object, to allow the object to rotate relative to the robot hand by the action of gravity while preventing the object from dropping from the robot hand,
   the object is formed with a through hole at a position separated from a center of gravity of the object,
   the robot hand includes:
      plurality of claws; and
      a claw driver which moves the plurality of claws in directions approaching and separating away from each other,
   the arrangement determination part determines the position and posture of the robot hand in which the plurality of claws is positionable inside the through hole, and
   the robot hand controller
      controls the claw driver so as to move the plurality of claws in directions separating away from each other to press the plurality of claws against a wall surface which defines the through hole, to grip the object by the plurality of claws; and
      controls the claw driver so as to move the plurality of claws in directions approaching each other to allow the object to rotate relative to the robot hand, when the robot hand is arranged at the position and posture in which the moment is generated at the object.

2. The object pick-up system according to claim 1, wherein the claws are arranged horizontally, or are arranged to be inclined with respect to the horizontal direction so that distal ends of the claws are positioned vertically upward of proximal ends of the claws, when the robot hand is arranged at the position and posture in which the moment is generated at the object.

3. The object pick-up system according to claim 1, wherein the robot hand further includes an arm attached to the manipulator and holding the plurality of claws, wherein
the plurality of claws extend so as to be inclined with respect to the arm.

4. The object pick-up system according to claim 1, wherein the arrangement determination part determines the position and posture of the robot hand to grip the object without the robot hand and the manipulator interfering with a surrounding member.

5. The object pick-up system according to claim 1, wherein the robot hand controller controls the robot hand so as to grip the object so that the object is again immovable relative to the robot hand, when the rotation of the object stops.

6. A method of gripping and picking up stacked objects by a robot hand, the method comprising:
  detecting a position and posture of an object;
  determining a position and posture of the robot hand when the robot hand grips the object based on the detected position and posture of the object;
  arranging the robot hand at the determined position and posture of the robot hand;
  gripping the object by the robot hand so that the object is immovable with respect to the robot hand;
  arranging the robot hand at a position and posture in which a moment is generated at the object when the robot hand gripping the object lifts up the object; and
  decreasing a force, by which the robot hand grips the object, after the robot hand is arranged at the position and posture in which the moment is generated at the object, to rotate the object relative to the robot hand by the action of gravity while preventing the object from dropping from the robot hand,
wherein
the object is formed with a through hole at a position separated from a center of gravity of the object,
the robot hand includes:
  a plurality of claws; and
  a claw driver which moves the plurality of claws in directions approaching and separating away from each other,
said determining the position and posture of the robot hand is performed when the plurality of claws is positioned inside the through hole,
said gripping the object by the robot hand comprises controlling the claw driver so as to move the plurality of claws in directions separating away from each other to press the plurality of claws against a wall surface which defines the through hole, to grip the object by the plurality of claws, and
said decreasing the force, by which the robot hand grips the object, comprises controlling the claw driver so as to move the plurality of claws in directions approaching each other to allow the object to rotate relative to the robot hand, when the robot hand is arranged at the position and posture in which the moment is generated at the object.

* * * * *